United States Patent
Wilson et al.

(10) Patent No.: US 10,102,229 B2
(45) Date of Patent: Oct. 16, 2018

(54) VALIDATING DATA INTEGRATIONS USING A SECONDARY DATA STORE

(71) Applicant: Palantir Technologies Inc., Palo Alto, CA (US)

(72) Inventors: Timothy Wilson, Palo Alto, CA (US); Kevin Morgan, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/347,637

(22) Filed: Nov. 9, 2016

(65) Prior Publication Data
US 2018/0129684 A1    May 10, 2018

(51) Int. Cl.
G06F 7/00 (2006.01)
G06F 17/30 (2006.01)

(52) U.S. Cl.
CPC .. G06F 17/30297 (2013.01); G06F 17/30292 (2013.01)

(58) Field of Classification Search
CPC ................................................ G06F 17/30292
See application file for complete search history.

(56) References Cited

U.S. PATENT DOCUMENTS

| | | |
|---|---|---|
| 6,289,338 B1 | 9/2001 | Stoffel et al. |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,640,231 B1 | 10/2003 | Andersen et al. |
| 6,748,481 B1 | 6/2004 | Parry et al. |
| 6,877,137 B1 | 4/2005 | Rivette et al. |
| 7,027,974 B1 | 4/2006 | Busch et al. |
| 7,089,541 B2 | 8/2006 | Ungar |
| 7,237,192 B1 | 6/2007 | Stephenson et al. |
| 7,240,330 B2 | 7/2007 | Fairweather |
| 7,533,069 B2 | 5/2009 | Fairweather |
| 7,685,083 B2 | 3/2010 | Fairweather |
| 7,877,421 B2 | 1/2011 | Berger et al. |
| 7,962,495 B2 | 6/2011 | Jain et al. |
| 8,117,022 B2 | 2/2012 | Linker |

(Continued)

FOREIGN PATENT DOCUMENTS

| | | |
|---|---|---|
| CA | 2666364 | 1/2015 |
| DE | 102014204840 | 9/2014 |

(Continued)

OTHER PUBLICATIONS

"A Tour of Pinboard," <http://pinboard.in/tour> as printed May 15, 2014 in 6 pages.

(Continued)

Primary Examiner — Ajith Jacob
(74) Attorney, Agent, or Firm — Hickman Palermno Becker Bingham LLP

(57) ABSTRACT

A data integration system provides a secondary validation data store that may be used as a staging area for testing and validating data integrations for a set of structured data. Ontology data that defines a schema for integrated data may be modified and tweaked. The secondary validation data store is more efficient than a production system for such schema modifications. Once the ontology data is satisfactory, the structured data and the ontology data may be loaded into a production system.

20 Claims, 4 Drawing Sheets

(56) References Cited

U.S. PATENT DOCUMENTS

| | | |
|---|---|---|
| 8,132,149 B2 | 3/2012 | Shenfield et al. |
| 8,271,948 B2 | 9/2012 | Talozi et al. |
| 8,332,354 B1 | 12/2012 | Chatterjee et al. |
| 8,418,085 B2 | 4/2013 | Snook et al. |
| 8,489,623 B2 | 7/2013 | Jain et al. |
| 8,560,494 B1 | 10/2013 | Downing |
| 8,689,182 B2 | 4/2014 | Leithead et al. |
| 8,855,999 B1 | 10/2014 | Elliot |
| 8,903,717 B2 | 12/2014 | Elliot |
| 8,930,897 B2 | 1/2015 | Nassar |
| 9,009,827 B1 | 4/2015 | Albertson et al. |
| 9,201,920 B2 | 12/2015 | Jain et al. |
| 9,223,773 B2 | 12/2015 | Isaacson |
| 9,229,952 B1 | 1/2016 | Meacham et al. |
| 2003/0074187 A1 | 4/2003 | Ait-Mokhtar et al. |
| 2003/0172053 A1 | 9/2003 | Fairweather |
| 2003/0177112 A1 | 9/2003 | Gardner |
| 2004/0044992 A1 | 3/2004 | Muller et al. |
| 2004/0083466 A1 | 4/2004 | Dapp et al. |
| 2004/0221223 A1 | 11/2004 | Yu et al. |
| 2004/0260702 A1 | 12/2004 | Cragun et al. |
| 2005/0039119 A1 | 2/2005 | Parks et al. |
| 2005/0091420 A1 | 4/2005 | Snover et al. |
| 2005/0183005 A1 | 8/2005 | Denoue et al. |
| 2006/0271838 A1 | 11/2006 | Carro |
| 2007/0074169 A1 | 3/2007 | Chess et al. |
| 2007/0078872 A1 | 4/2007 | Cohen |
| 2007/0112714 A1 | 5/2007 | Fairweather |
| 2007/0233709 A1 | 10/2007 | Abnous |
| 2008/0034327 A1 | 2/2008 | Cisler et al. |
| 2008/0140387 A1 | 6/2008 | Linker |
| 2008/0148398 A1 | 6/2008 | Mezack et al. |
| 2008/0228467 A1 | 9/2008 | Womack et al. |
| 2008/0281580 A1 | 11/2008 | Zabokritski |
| 2009/0172821 A1 | 7/2009 | Daira et al. |
| 2009/0177962 A1 | 7/2009 | Gusmorino et al. |
| 2009/0228507 A1 | 9/2009 | Jain et al. |
| 2009/0254970 A1 | 10/2009 | Agarwal et al. |
| 2010/0011282 A1 | 1/2010 | Dollard et al. |
| 2010/0204983 A1 | 8/2010 | Chung et al. |
| 2010/0257015 A1 | 10/2010 | Molander |
| 2010/0257515 A1 | 10/2010 | Bates et al. |
| 2010/0306285 A1 | 12/2010 | Shah et al. |
| 2010/0313119 A1 | 12/2010 | Baldwin et al. |
| 2011/0213791 A1 | 9/2011 | Jain et al. |
| 2011/0258216 A1 | 10/2011 | Supakkul et al. |
| 2012/0137235 A1 | 5/2012 | Ts et al. |
| 2012/0191446 A1 | 7/2012 | Binsztok et al. |
| 2012/0221553 A1 | 8/2012 | Wittmer et al. |
| 2012/0304150 A1 | 11/2012 | Leithead et al. |
| 2013/0024268 A1 | 1/2013 | Manickavelu |
| 2013/0086482 A1 | 4/2013 | Parsons |
| 2013/0091084 A1 | 4/2013 | Lee |
| 2013/0124193 A1 | 5/2013 | Holmberg |
| 2013/0225212 A1 | 8/2013 | Khan |
| 2013/0246560 A1 | 9/2013 | Feng et al. |
| 2013/0251233 A1 | 9/2013 | Yang et al. |
| 2013/0275446 A1 | 10/2013 | Jain et al. |
| 2014/0019423 A1 | 1/2014 | Leinsberger et al. |
| 2014/0047319 A1 | 2/2014 | Eberlein |
| 2014/0244388 A1 | 8/2014 | Manouchehri et al. |
| 2014/0279838 A1* | 9/2014 | Tsirogiannis ..... G06F 17/30292 707/603 |
| 2015/0046481 A1 | 2/2015 | Elliot |
| 2015/0100559 A1 | 4/2015 | Nassar |
| 2015/0142766 A1 | 5/2015 | Jain et al. |
| 2015/0261847 A1 | 9/2015 | Ducott et al. |

FOREIGN PATENT DOCUMENTS

| | | |
|---|---|---|
| DE | 102014215621 | 2/2015 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 3018553 | 5/2016 |
| GB | 2366498 | 3/2002 |
| GB | 2513007 | 10/2014 |
| GB | 2518745 | 4/2015 |
| NL | 2013306 | 2/2015 |
| NL | 2011642 | 8/2015 |
| WO | WO 2002/035376 | 5/2002 |
| WO | WO 2003/060751 | 7/2003 |
| WO | WO 2008/064207 | 5/2008 |
| WO | WO 2011/071833 | 6/2011 |

OTHER PUBLICATIONS

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Palantir, "Extracting and Transforming Data with Kite," Palantir Technologies, Inc., Copyright 2010, pp. 38.

Palermo, Christopher J., "Memorandum," [Disclosure relating to U.S. Appl. No. 13/916,447, filed Jun. 12, 2013, and related applications], Jan. 31, 2014 in 3 pages.

Johnson, Maggie, "Introduction to YACC and Bison".

Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.

Niepert et al., "A Dynamic Ontology for a Dynamic Reference Work", Joint Conference on Digital Libraries, Jun. 17-22, 2007, Vancouver, British Columbia, Canada, pp. 1-10.

Anonymous, "BackTult—JD Edwards One World Version Control System," printed Jul. 23, 2007 in 1 page.

Delicious, <http://delicious.com/> as printed May 15, 2014 in 1 page.

Symantec Corporation, "E-Security Begins with Sound Security Policies," Announcement Symantec, Jun. 14, 2001.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Palantir, "Kite Data-Integration Process Overview," Palantir Technologies, Inc., Copyright 2010, pp. 48.

Palantir, https://docs.palantir.com/gotham/3.11.1.0/dataguide/baggage/KiteSchema.xsd printed Apr. 4, 2014 in 4 pages.

Wollrath et al., "A Distributed Object Model for the Java System," Conference on Object-Oriented Technologies and Systems, Jun. 17-21, 1996, pp. 219-231.

Klemmer et al., "Where Do Web Sites Come From? Capturing and Interacting with Design History," Association for Computing Machinery, CHI 2002, Apr. 20-25, 2002, Minneapolis, MN, pp. 8.

Palantir, "Kite," https://docs.palantir.com/gotham/3.11.1.0/adminreference/datasources.11 printed Aug. 30, 2013 in 2 pages.

Nivas, Tuli, "Test Harness and Script Design Principles for Automated Testing of non-GUI or Web Based Applications," Performance Lab, Jun. 2011, pp. 30-37.

Palantir, "The Repository Element," https://docs.palantir.com/gotham/3.11.1.0/dataguide/kite_config_file.04 printed Aug. 30, 2013 in 2 pages.

Palantir, "Kite Operations," Palantir Technologies, Inc., Copyright 2010, p. 1.

Palantir, https://docs.palantir.com/gotham/3.11.1.0/dataguide/baggage/KiteSchema printed Aug. 30, 2013 in 1 page.

Kokossi et al., "D7-Dynamic Ontoloty Management System (Design)," Information Societies Technology Programme, Jan. 10, 2002, pp. 1-27.

* cited by examiner

VALIDATING DATA INTEGRATIONS USING A SECONDARY DATA STORE

TECHNICAL FIELD

The technical field of the present disclosure relates to validating data integrations. More specifically, the disclosure relates to validating data integrations using a secondary data store.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Integrating data from disparate data sources into an existing data storage system having an established schema or ontology can be challenging. The process of moving data from one source into an established database, data repository or other storage system with a previously created schema or ontology may be termed a data integration. Integrating such data often requires defining or mapping schema relationships between varying data sources. Testing such schema relationships in a live production system, which is online and serving clients based on the data store, can degrade system performance and potentially cause data integrity issues. There is a need for techniques for validating data integrations without affecting the performance or integrity of a production system.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
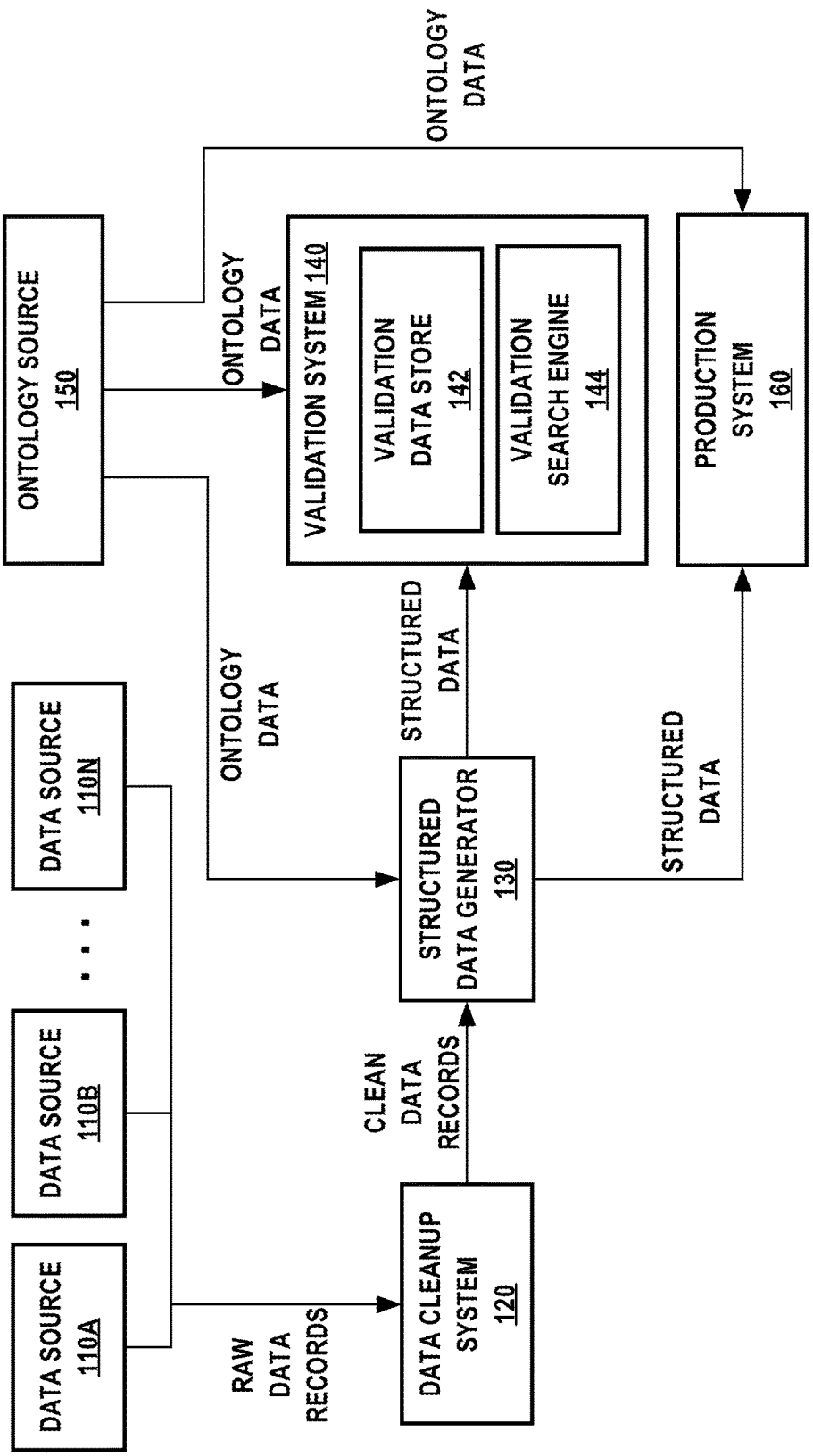
FIG. 1 is a block diagram of a data integration system in which the example embodiment(s) of the present invention may be embodied.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 DATA CLEANUP SYSTEM
   2.2 ONTOLOGY SOURCE
   2.3 STRUCTURED DATA GENERATOR
   2.4 VALIDATION SYSTEM
   2.5 PRODUCTION SYSTEM
3.0 EXAMPLE PROCESS AND ALGORITHM
4.0 IMPLEMENTATION MECHANISMS HARDWARE OVERVIEW
5.0 IMPLEMENTATION MECHANISMS SOFTWARE OVERVIEW
6.0 OTHER ASPECTS OF DISCLOSURE

1.0 GENERAL OVERVIEW

Complex production systems can integrate data from different data sources of varying formats and data types. Client computers associated with data analysts or other users can use the production system to view and manipulate data from disparate data sources to identify patterns, relationships, and other insights from large amounts of data. Such production systems contain large amounts of data, and therefore, such production systems often are subject to the introduction of errors and can be difficult to update and maintain. For example, changes to an existing schema for a production system can take a long time to apply to the production system due to the large volume of data or the complexity of the target schema or ontology.

Additionally, when new data sources are integrated into existing production systems, a new schema often must be defined for the new data, or a schema applicable to the new data must be mapped or transformed to coordinate with an existing schema or ontology of the target system. Schema definitions are often handled by data integration personnel who are responsible for integrating the new data retrieved from the data sources to the production system. However, errors in the schema definition or mapping can introduce unwanted data integrity issues or incorrect data relationships in the production system. This is unwanted because analyst or business users rely on the production system for analytical or business purposes. Additionally, sometimes it can be challenging to identify mistakes in schema definition, given the breadth of data being used in the production system.

The present data integration system is programmed or configured to allow for testing and validation of schema changes prior to loading data integrations into a production system. Data records are first extracted from various data sources. The data sources may be heterogeneous in format and content. The data integration system can apply data modification rules to the data records to sanitize them before further processing. Data modification rules can include joining disparate data sources, removing unwanted data, and/or normalizing values of data.

The data integration system is programmed or configured to receive a database schema for the newly extracted data records. The schema may be specified as ontology data. The data integration system applies the ontology data to the data records to generate a set of structured data that conforms to the schema. The structured data may first be stored in a secondary data store before storing the data in a production system. The secondary data store has various characteristics that make it a suitable candidate for validating the schema as a staging area. For example, the secondary data store does not provide fully-featured database functionality, such as edit functionality, logging, data object access permission controls, business user access, or real-time indexing. Thus, the secondary data store can be quickly built from structured data for testing data integration. Moreover, given that business users do not have access to the secondary data store, data may be deleted and reloaded into the secondary data store to repeatedly test adjustments and modifications to the schema until data integration personnel is satisfied with the schema. Once data integration personnel has approved the schema, the structured data and the schema may be sent to a production system for integration into the production data store. Therefore, the present techniques provide for validating data integrations using a secondary data store.

2.0 EXAMPLE COMPUTER SYSTEM IMPLEMENTATION

FIG. 1 illustrates an example in which the techniques described herein may be practiced, according to some embodiments. In the example of FIG. 1, data integration system 100 is a computer system programmed to perform data validation and may be implemented across one or more computing devices. The example components of data integration system 100 shown in FIG. 1 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Data integration system 100 illustrates only one of many possible arrangements of components configured to execute the programming described herein. Other arrangements may include fewer or different components, and the division of work between the components may vary depending on the arrangement.

Data integration system 100 includes one or more data sources 110A, 110B, 110N. For purposes of illustrating a clear example, three (3) instances of data sources are shown in FIG. 1, but the ellipsis in FIG. 1 and the label "N" in "110N" is intended to indicate that any number of data sources may be present in other embodiments. A data source may be any repository of computer-implemented data records. A data record may any computer-implemented data, such as a file, a data object, a database entry, a data message, or any other similar representation of computer-implemented data. In one embodiment, a data record may be represented as a file or entry in a file that is in a comma-separated value (CSV) format, or similar data set format. The embodiments described herein do not require any particular type or format of the data records provided by a data source. Thus, a data source may comprise a file system, a relational database managements system (RDBMS), a non-relational database, an object store, a distributed file system (DFS) such as a Hadoop distributed file system (HDFS), a Java Database Connectivity (JDBC) source, an email repository, data received through an application programming interface (API), a source code repository, a cloud-based data repository such as Amazon Simple Storage Service (S3), a message queue, or any other repository on one or more computing devices that contains data records. Each of the data sources 110A, 110B, 110N may be implemented as a different type of data source. For example, in data integration system 100, data source 110A may be a HDFS data source, data source 110B may be a RDBMS data source, and data source 110N may be a traditional file system data source.

For purposes of illustrating a clear example, a concrete example of one set of data sources 110A and 110B will be given to illustrate how the techniques of the present data integration system 100 may be used. This example will be referred to as the Customer/Vehicle example and is not intended to be limiting and is only intended to be used for exemplary purposes. This example will be revisited for purposes of describing various components of data integration system 1100. In the Customer/Vehicle example, data source 110A may be a file system that includes a first CSV file that contains data regarding customers. For example, the first CSV file may contain data regarding customers of a rental car agency. Thus, each entry in the first CSV file may represent a particular customer and may include information regarding characteristics of the particular customer, such as customer number, name, date of birth, address, weight, height, and/or eye color. Similarly, data source 110B may be a file system that includes a second CSV file that contains data regarding vehicles, such as vehicles rented by the rental car agency. Thus, each entry in the second CSV file may represent a vehicle and may include information regarding the particular vehicle, such as vehicle number, make, model, color, and license plate number.

Data integration system 100 includes data cleanup system 120, which is communicatively coupled to data sources 110A, 110B, 110N. Data cleanup system 120 is programmed or configured to extract raw data records from data sources 110A, 110B, 110N and apply one or more data cleanup rules to the raw data records to generate clean data records.

Data integration system 100 includes structured data generator 130. Structured data generator 130 is communicatively coupled to data cleanup system 120. Structured data generator 130 is programmed or configured to receive clean data records from data cleanup system 120. Structured data generator 130 is further programmed or configured to receive ontology data from ontology source 150. Ontology data defines a schema for the clean data records. Structured data generator 130 can thus apply the ontology data to the clean data records to generate structured data. Structured data generator 130 is programmed or configured to send structured data to validation system 140 and/or production system 160.

Data integration system 100 includes validation system 140, which is communicatively coupled to structured data generator 130. Validation system 140 may be used as an interim staging area for quickly and easily viewing the contents of structured data and validating the schema of the ontology data. Thus, the validation system 140 can be used as a staging area for verifying the format and contents of structured data before the structured data is loaded into production system 160. Validation system 140 may include validation data store 142, which may provide more limited functionality than a typical data store for storing structured data, as will be described herein. Validation system 140 may further include validation search engine 144. Validation search engine 144 may be used to search the contents of validation data store 142. In one embodiment, validation search engine 144 may be viewable via a user interface, such as a web browser or application. Thus, given its lightweight nature, validation data store 142 can be quickly and easily updated and re-updated to test and validate data stored in validation data store 142.

Data integration system 100 includes ontology source 150 which is programmed or configured to allow a user to view and/or modify the contents of ontology data. Ontology source 150 may optionally be communicatively coupled to structured data generator 130, validation system 140, and/or production system 160.

Data integration system 100 includes production system 160, which is programmed or configured to display structured data to users in a live production environment. Production system 160 may include a large data store and may be accessible to business users.

2.1 Data Cleanup System

Data cleanup system 120 is programmed or configured to extract raw data records from data sources 110A, 110B, 110N and apply one or more data cleanup rules to the raw data records to generate a set of clean data records.

Data cleanup system 120 is programmed or configured to extract one or more raw data records from data sources 110A, 110B, 110N. A raw data record is a data record that is formatted in a similar format as what is found in data source 110A, 110B, 110N. Different types of raw data records can be extracted from each of data source 110A, 110B, 110N. For example, in one embodiment, a raw data record may be represented as a CSV file.

Data cleanup system 120 is programmed or configured to apply one or more data cleanup rules to the raw data records extracted from data sources 110A, 110B, 110N in order to generate clean data records. A data cleanup rule is any computer-implemented instruction for modifying a data record. For example, a data cleanup rule may include instructions for removing unsupported characters from raw data records, such as by removing non-alphanumeric American Standard Code for Information Interchange (ASCII) characters or converting data records to Unicode Transformation Format 8-bit (UTF-8) format. In another embodiment, a data cleanup rule may include instructions for validating and ensuring that every row in a data record contains the same number of columns. In another embodiment, a data cleanup rule may include instructions for deleting empty lines from the end of a file. In one embodiment, data cleanup rules may be provided by data integration personnel.

In one embodiment, a data cleanup rule can be programmed or configured to remove unwanted, unnecessary, or extraneous fields from a raw data record. For example, if a raw data record is represented as a CSV file, a data cleanup rule may be applied to the CSV file to remove unnecessary columns of data from the CSV file. In the Customer/Vehicle example, data cleanup system 120 may programmed or configured such that the eye color of each customer is unnecessary, thus the eye color column is removed from the raw data records received from the data source 110A when generating clean data records.

In one embodiment, a data cleanup rule can be programmed or configured to normalize incoming raw data records. Normalization can be used to transform the contents of a data record for appropriate use by the data integration system 100 and may include any sort of transformation of a value based on business logic. For example, if a raw data record is represented as a CSV file, a data cleanup rule may be applied to a field in the CSV file to normalize data in that field. In the prior Customer/Vehicle example, the raw data record for a customer may include height information for each customer represented in a British Imperial unit (e.g., feet and inches). A data cleanup rule can be programmed or configured to normalize the height information into a metric unit (e.g. meters). Thus, a data cleanup rule can be used by data cleanup system 120 to ensure that the clean data records that are generated by the data cleanup system 120 conform to the normalization standards of the data integration system 100.

In one embodiment, a data cleanup rule can be programmed or configured to join data records from multiple data sources 110A, 110B, 110N. Data records from different data sources may be interrelated and thus can be joined. In the Customer/Vehicle example of data source 110A representing customers and data source 110B representing vehicles, each of the data sources 110A and 110B include information regarding a vehicle number. Thus, vehicle number can be used to establish a relationship between customers and vehicles, which may represent, for example, a vehicle that the customer rented from the rental car agency. Joining data sources therefore allows the data cleanup system 120 to be programmed or configured to establish relationships between data coming from different data sources 110A, 110B, 110N.

The output of data cleanup system 120 is a set of clean data records that are generated by data cleanup system 120. Clean data records represent the results of applying data cleanup rules to the raw data records that were originally extracted from data sources 110A, 110B, 110N. In one embodiment, clean data records may be represented as a CSV file. Clean data records are then sent to structured data generator 130.

2.2 Ontology Source

Data integration system 100 includes ontology source 150 which is programmed or configured to allow a user to view and/or modify the contents of ontology data. Ontology source may optionally be communicatively coupled to structured data generator 130, validation system 140 and/or production system 160. In one embodiment, ontology source 150 may be accessible via a user interface at a computing device, such as a mobile device, desktop, laptop, or other computing device. Ontology source 150 can be used to generate and/or modify ontology data.

Ontology data defines a schema to be applied to clean data records. For example, a schema may define various characteristics of clean data records, as well as relationships among the data records. A schema may define which parts of data records represent objects. The schema may specify object types. A schema may further define which parts of a data records represent properties of objects. The schema may define property types. A schema may further define which parts of data records represent links between objects. A link is a relationship between objects.

Returning to the Customer/Vehicle example, different ontologies can be used for describing the set data found in data records for customers and vehicles. Thus, by varying the schema of the ontology data, the configuration of the data can be varied. TABLE A provides an example of a schema for ontology data of the Customer/Vehicle example, according to one embodiment:

TABLE A

```
{
  customer: object (
    customer_number: int
    customer_name: string
    customer_dob: date
    customer_address: string
    customer_weight: int
    customer_height: int);
  vehicle: object (
    vehicle_number: int
    vehicle_make: string
```

TABLE A-continued

```
        vehicle_model: string
        vehicle_color: string
        vehicle_license_plate_num: string);
    rented_vehicle_relationship: link (
        customer.customer_number :: vehicle.vehicle_number);
}
```

In the example of TABLE A, ontology data may indicate that each customer is represented as its own object with a set of customer object properties. Thus, each customer object has various properties that can be determined from the clean data records, including, but not limited to customer number, name, date of birth, address, weight, height, and vehicle number. Likewise, ontology data may indicate that each vehicle is represented as its own object. Each vehicle has various properties that can be determined from the clean data records, including, but not limited to vehicle number, make, model, color, and license plate number. The ontology may specify the types for the various properties of the customer and vehicle objects, such as string, integer, etc. Finally, ontology data may specify a link between customer objects and vehicle objects. A link describes a relationship between two or more objects. In the above example of TABLE A, a rented vehicle relationship may be used to create a link between a customer and the vehicle(s) that the customer has rented. These relationships may be defined in data records that link the customer.customer_number property to the vehicle.vehicle_number property. In another embodiment, a link may also describe optional metadata for the relationship, such as the amount of money paid for the vehicle or the date of the rental transaction.

However, in another embodiment, different ontology data can be used for specifying a second schema for the data objects. TABLE B provides an example of an alternative schema for ontology data of the Customer/Vehicle example, according to one embodiment:

TABLE B

```
{
    customer: object (
        customer_number: int
        customer_name: string
        customer_dob: date
        customer_address: string
        customer_weight: int
        customer_height: int
        vehicle_number: int
        vehicle_make: string
        vehicle_model: string
        vehicle_color: string
        vehicle_license_plate_num: string);
}
```

In this alternative embodiment of TABLE B, ontology data may indicate that each customer is represented as its own object with a set of customer object properties, including, but not limited to customer number, name, date of birth, address, weight and height. However, in this alternative embodiment, ontology data may indicate that vehicle data represents additional properties of customer objects rather than establishing independent vehicle objects for vehicles. Thus, instead of establishing link relationship between customer objects and vehicle objects, the information for vehicles is represented as properties embedded within the customer objects themselves by joining the data for customers and vehicles. In this case, the joining of data for customers and vehicles may be based on data records that describes rental transactions of customers for vehicles. Thus, a user can specify different ontology data to achieve a different organization of the clean data records, based on the business needs of the project.

In one embodiment, ontology data may be specified via one or more configuration files. A configuration file for specifying ontology data may be in any markup language or data format syntax, such as extensible markup language (XML), "YAML Ain't Markup Language" (YAML), JavaScript Object Notation (JSON), or data definition language (DDL) and is stored in the form of digital data in a storage device or digital memory.

In one embodiment, ontology source 150 provides ontology data to structured data generator 130, validation system 140, and/or production system 160.

In one embodiment, ontology source 150 may receive schema modification instructions that specify one or more modifications to existing ontology data. Such schema modification instructions may be received via a user interface. For example, data integration personnel that is accessing data in validation data store 142 may provide schema modification instructions. Upon receiving schema modification instructions, ontology source 150 may be programmed or configured to modify the ontology data based on the schema modification instructions and redistribute the newly modified ontology data to structured data generator 130, validation system 140 and/or production system 160. Thus, ontology source 150 may be used for rapid iterative development of ontology data.

2.3 Structured Data Generator

Structured data generator 130 is programmed or configured to receive clean data records from data cleanup system 120 and ontology data from ontology source 150. Structured data generator 130 is programmed to apply the ontology data received from ontology source 150 toe clean data records to generate structured data. Structure data is data that has the schema of ontology data applied. Structured data generator 130 is programmed or configured to send structured data to validation system 140 and/or production system 160.

In one embodiment, structured data generator 130 initially only sends structured data to validation system 140, without sending structured data to production system 160. This provides users with an opportunity to view and validate the structured data in validation system 140 prior to sending structured data to production system 160.

In one embodiment, structured data generator 130 may be programmed or configured as a script, job, or other computing process. For example, a script may convert each row of a data record into a data object. In one embodiment, structured data may be formatted in any markup language or data format syntax, such as extensible markup language (XML), "YAML Ain't Markup Language" (YAML), or JavaScript Object Notation (JSON).

2.4 Validation System

Data integration system 100 includes validation system 140 which is programmed or configured to receive structured data. Validation system 140 is thus programmed or configured to be used as an interim staging area for validating the format and contents of structured data before the structured data is loaded into production system 160.

Validation system 140 is programmed or configured to store structured data in validation data store 142. Validation data store 142 is a secondary data store that provides limited functionality compared to a fully-featured data store. The lightweight nature of validation data store 142 allows for data to be quickly loaded into validation data store 140 for rapid prototyping and staging of data to determine the preferred schema of ontology data. The efficiency of using validation data store 142 makes it easy to iteratively test changes to ontology data, in order to define an optimal schema of data integrations for the business problem being presented.

Validation data store 142 is programmed or configured to provide various features of lesser scope compared to a more fully-featured data store that allow for rapid deployment and deletion of data in the validation data store 142. In one embodiment, validation data store 142 is programmed or configured to prevent any edit functionality, thus, once data is loaded into validation data store 142, it may not be edited and can only be deleted. By limiting the edit functionality of the validation data store 142, the validation data store 142 uses less computing resources, such as processing power, memory, and disk space, as computing resources do not need to be dedicated to supporting edit functionality, such as handling of atomicity, consistency, isolation, or durability of a traditional database system.

In one embodiment, validation data store 142 is programmed or configured to not provide a user interface for business users and is only accessible to data integration personnel. Thus, validation data store 142 is only accessible to data integration personnel and is not available to business users that are attempting to browse the resulting data for business purposes. This limits the availability of the validation data store 142 and allows the validation data store 142 to serve as a temporary staging area that will not affect business users that rely on production system 160.

In a production system 160, user access permissions can be used for customizing user account access to data objects or groups of data objects. The user access permissions of production system 160 can control the ability of business user accounts to interact with data objects, including view, edit, and/or delete functionality. In one embodiment, validation data store 142 is programmed or configured such that it does not provide customized user access permissions. Instead, validation data store 140 is firewalled away from business user accounts that are accessing production system 160. This allows data integration personnel to access the validation data store 142, without having to implement the overhead of traditional access permissions as is required in a production system 160.

In one embodiment, validation data store 142 does not store log data regarding transactions, edits, views, errors, warning, or modifications to the underlying data in validation data store 142. Given that the validation data store 142 is a temporary staging area, log data can be omitted, thereby improving the efficiency of loading and deleting data in the validation data store 142.

In one embodiment, validation data store 142 may store contents in a JSON blob. Storing contents as JSON blobs allow for the arbitrary storage of data elements. By comparison, a relational database often requires data be stored according to a rigid relational database schema, that does not allow for arbitrary storage of data elements. Thus, by using JSON blobs, validation data store 142 can quickly and easily adapt to schema changes introduced by modifications to ontology data.

In one embodiment, validation search engine 144 may asynchronously index the contents of validation data store 142 to generate one or more search indices. This may provide improved search efficiency. For example, validation search engine 144 can asynchronously index validation data store 142 when validation data store 142 is not experiencing read/write accesses, or when the read/write accesses of validation data store 142 are at a low throughput load. Asynchronously indexing the contents of validation data store 142 ensures that the indexing operation does not affect the read/write performance of the validation data store 142. In one embodiment, validation search engine 144 may further asynchronously write to validation data store 142, thereby ensuring that write requests coming from validation search engine 144 do not compromise system performance of validation data store 142. Additionally, in one embodiment, validation search engine 144 can be optimized to perform efficient searches of validation data store 142 without having to persistently store data itself, as validation data store 142 ensures persistent storage of data.

In one embodiment, validation search engine 144 is optimized to perform fast searches of the contents of the validation data store 142. For example, in one embodiment, validation search engine 144 does not store and/or verify access permissions, thereby reducing the time needed to process search queries, which typically require ensuring a user has appropriate access permissions to access data in validation data store 142. In one embodiment, validation data store 144 does not need to store and/or verify access permissions because validation system 140 is only accessible to a limited subset of data integration personnel and is thus unavailable to other users. Therefore, validation search engine 144 can provide comparable security by firewalling the entire system away from business users, without needing to store or track access permissions for individual business users.

In one embodiment, validation search engine 144 does not support transactions, therefore, the overhead for transaction processing in a traditional database system are not incurred when processing database search queries. Thus, validation search engine 144 provides improved search performance.

In one embodiment, indices generated by validation search engine 144 may be distributed across shards in a sharded database, thereby providing improved search performance. Rebalancing indices across shards is performed automatically and search queries are routed to the shard containing the relevant portion of a, index that is necessary to service the query. By distributing indices across shards, validation search engine 144 can balance the load required by indexing and performing search functions against validation data store 142, thereby improving search performance.

In another embodiment, validation data store 142 may index its own contents without the use of a validation search engine 144.

In one embodiment, validation data store 142 may be organized into tables, such as in a relational database system. For example, each object type in the ontology data may be stored as a table in the validation data store 142. In the Customer/Vehicle example according to TABLE A, one table may be used for representing customer objects, and another table may be used for representing vehicle objects. Furthermore, each property of an object in the ontology data may be stored in the respective object table as a field of a column. Thus, in the Customer/Vehicle example according to TABLE A, the customer object table will include fields for customer number, name, date of birth, address, weight, and weight; and the vehicle object table will include fields for vehicle number, make, model, color, and license plate number. In one embodiment, validation data store 142 may further include a table for links, wherein each entry in the links table represents a linked relationship between two particular objects.

In one embodiment, a validation data store 142 may further include a table that describes integrations included in the validation data store 142. For example, an integration may describe the objects, links, data sources, and/or access permissions for a given set of structured data added to validation store. Over time, as additional structured data is added, the integrations table may be used a source of truth to describe the provenance and organization of data.

In one embodiment, a data integration personnel can access the contents of a validation data store 142, including objects, properties, links, and/or integrations. In one embodiment, the contents of validation data store 142 are accessible via a user interface, such as a web portal, application, or command line interface. Thus, data integration personnel can use validation data store 142 to view the effects of particular choices in schema definition for the ontology data to determine the optimal configuration of relationships of data for the business need. If the data integration personnel is not satisfied with the data in validation data store 142, they may delete the relevant tables of validation data store 142, modify the ontology data, and reimport new structured data for validation data store 142. This allows data integration personnel to quickly and efficiently iterate to find an optimal configuration of the ontology data. Once they have validated a configuration of the ontology data, the structured data may be loaded into production system 160 for live use.

In one embodiment, ontology data is not provided to validation system 140. Instead, validation system 140 may approximate a schema for the structured data. For example, assume that structured data provided to validation system 140 includes a first field that contains alphanumeric characters, and a second field that contains numeric characters. Validation system 140 may be programmed or configured to approximate a schema for the supplied structured data by inferring that the first field is a first property with a string type and the second field is a property with an integer type. This approximation is based approximation heuristics applied to the structure or content of structured data. In one embodiment, the approximated schema may be viewable by data integration personnel, who can either verify the accuracy of the approximation or indicate that the approximation is invalid and should not be applied. By providing an approximation of a schema for the structured data, the validation system 140 assists data integration personnel with integrating data from multiple data sources, while still allowing data integration personnel to revoke the approximation if it is incorrect.

In one embodiment, when ontology data is not provided to validation system 140, a generic ontology is used. A generic ontology is an ontology in which every object is a generic entity object and every property can be a generic description property. For example, generic description properties may be represented as strings. Thus, a generic ontology allows for data integration personnel to quickly and easily build an ontology from scratch, starting with a generic ontology.

2.5 Production System

Production system 160 is a final live version of a data integration environment. Structured data and ontology data can be loaded into a data store in production system 160 once the data integrations have been validated using validation system 140. Since production system 160 stores live data that is used by business end users, the data store associated with production system 160 (not depicted) is necessarily more heavy-weight than validation data store 142. Specifically, the data store associated with production system 160 typically provides edit functionality, user access permissions, is user-facing, tracks historical and log entries, and is synchronously indexed. Furthermore, production system 160 likely contains large amounts of data from previous data integration imports. Thus, production system 160 is less nimble at iterative changes to ontology data and is more fragile. In fact, revised changes to ontology data after structured data is loaded into production system 160 may introduce performance issues and/or data integrity issues with live data being used by end users. In some instances, it may be difficult or impossible to remove ontology types from a production system after introducing them to a production system. Thus, it is preferable to make any modifications to ontology data while working with validation system 130 to prevent errors.

3.0 EXAMPLE PROCESS AND ALGORITHM

Figure 2:
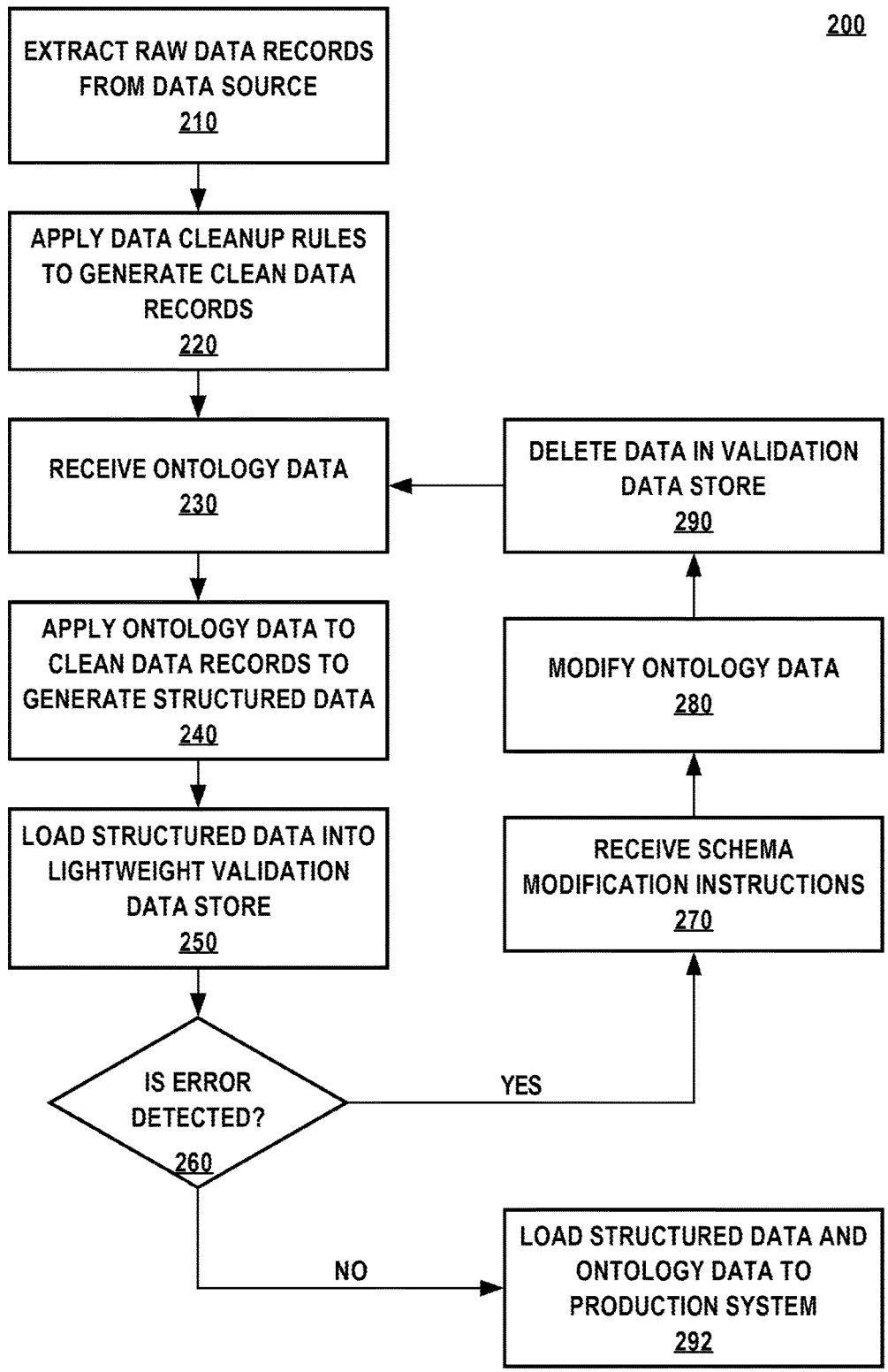
FIG. 2 is a flow diagram of a process for data integration, according to one embodiment.

FIG. 2 illustrates a flow diagram of an example process 200 for performing data integration, according to one embodiment.

FIG. 2 is intended to disclose an algorithm or functional description that may be used as a basis of writing computer programs to implement the functions that are described herein and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity.

Process 200 begins at step 210. In step 210, data cleanup system 120 is programmed or configured to extract raw data records from one or more data sources 110A, 110B, 110N. Data sources 110A, 110B, 110N may include data stored in different data formats and styles. Raw data records can be in any format, such as CSV file. Extraction may comprise reading records and selecting portions of records, or a subset of fields, or parsing CSV coding or other encoding to separate data fields and organize them in memory. The process 200 may then proceed to step 220.

In step 220, data cleanup system 120 is programmed or configured to apply one or more data cleanup rules to the raw data records extracted in step 210. Data cleanup rules may include any rule for modification of data in a raw data record. For example, data cleanup rules may include dropping or removing columns of data that are not necessary, normalizing values, and/or joining data from multiple data sources 110A, 110B, 110N. Data cleanup system 120 thus generates clean data records, which are then sent to structured data generator 130. Clean data records can be in any format, such as CSV. The process 200 may then proceed to step 230.

In step 230, structured data generator 130 is programmed or configured to receive ontology data from ontology source 150. Receiving ontology data may comprise reading a configuration file, calling a method that returns the ontology as a structured data item, or other techniques. In one embodiment, ontology data may be provided to ontology source 150 via a user interface connected to ontology source 150. The process 200 may then proceed to step 240.

In step 240, structured data generator 130 is programmed or configured to apply the ontology data received in step 230 to the clean data records generated in step 220. Thus, structured data generator 130 is programmed or configured to generate structured data that conforms to the ontology data. For example, structured data generator 130 may be programmed to match names of columns or fields in the clean data records to object names and attribute names represented in the ontology and then to generate a digital memory representation of the clean data records that conforms to the ontology. Structured data may be formatted in any data format, such as a markup language (e.g., XML) or a JSON blob. The process 200 may then proceed to step 250.

In step 250, the structured data generated in step 240 is loaded into a validation data store 142. Validation data store 142 provides less functionality than a data store associated with production system 160. For example, in certain embodiments, validation data store 142 does not provide edit functionality, user access permissions, is not end-user facing, does store log data, and/or does not index data. Thus, loading of data into validation data store 142 occurs faster than loading data into production system 160. Furthermore, production system 160 may include a significant amount of legacy data that increased processing overhead of loading data, thus, validation data store 142 is more efficient than production system 160. The process 200 may then proceed to step 260.

In step 260, the data integration system 100 determines whether there is an error with the existing format of data in the validation store 142 or not. Various forms of checking, comparison and error testing may be performed to determine if applying the ontology to the clean data records resulted in a successful data integration or an error. In one embodiment, information about the validity or approval of an attempted data integration may be received via user input from one or more data integration personnel who are viewing a graphical view of the data integration in data validation store 142 using a computer display device. Input may indicate validation and/or sign-off to approve the data integration, or negative feedback indicating an error. In one embodiment, approval may be denied automatically by the validation system 140 if the validation system 140 detects one or more exceptions, warnings, or errors with the format of the data stored in validation data store 142. If no error is detected in the data validation store 142, the process 200 may proceed to step 292. If an error is detected in the data validation store 142, the process 200 may proceed to step 270.

In step 270, the validation data store 142 has validation errors or other issues. For example, data integration personnel may have noticed errors in the data, failure of a column or field type in the clean data to match any part of the ontology, matching or mapping to the wrong object or attribute of the ontology, or otherwise that the structure or schema of the data stored in validation data store 142 is not optimal for the business needs. Thus, in step 270, ontology source 150 is programmed or configured to receive schema modification instructions. Schema modification instructions are received computing device and may represent either modifications to the existing ontology data or a new set of ontology data altogether. The process 200 may then proceed to step 280.

In step 280, the ontology source 150 is programmed or configured to use the schema modification instructions to modify the ontology data and send the updated ontology data to structured data generator 130 and/or validation system 140. Schema modification instructions can be specified via any syntax for modifying the schema of a data store, including, but not limited to a markup language, DDL, JSON, or similar syntax. In one embodiment, the ontology source 150 may use the schema modification instructions to generate a new set of ontology data to send to structured data generator 130 and/or validation system 140. The process 200 may then proceed to step 290.

In step 290, some or all of the data in validation data store 142 is deleted or dropped. The data in validation data store 142 may be quickly and easily deleted because the data validation store is lightweight and is not a live production environment. In another embodiment, the data cleanup rules may need to be modified to generate a revised set of clean data records. Each data integration being validated in validation system 140 may be segregated into separate database tables, thereby allowing those specific database tables to be deleted and rebuilt. Thus, by deleting one or more tables in validation data store 142, the contents of the validation data store 142 may be rebuilt using updated ontology data to test another schema. The process 200 may then proceed to step 230 to receive the new modified ontology data repeat the validation across steps 240, 250, and 260 using the new modified ontology data.

In step 292, the data integration system 100 has determined that the data in validation data store 142 is valid and that the ontology data is approved by the data integration personnel. Thus, data integration system 100 may load the structured data from structured data generator 130 and the ontology data from ontology source 150 for loading into the data store associated with production system 160. This will cause the structured data to be fully integrated into the production system 160 for use by business users. The process 200 may then end.

4.0 IMPLEMENTATION MECHANISMS—HARDWARE OVERVIEW

Figure 3:
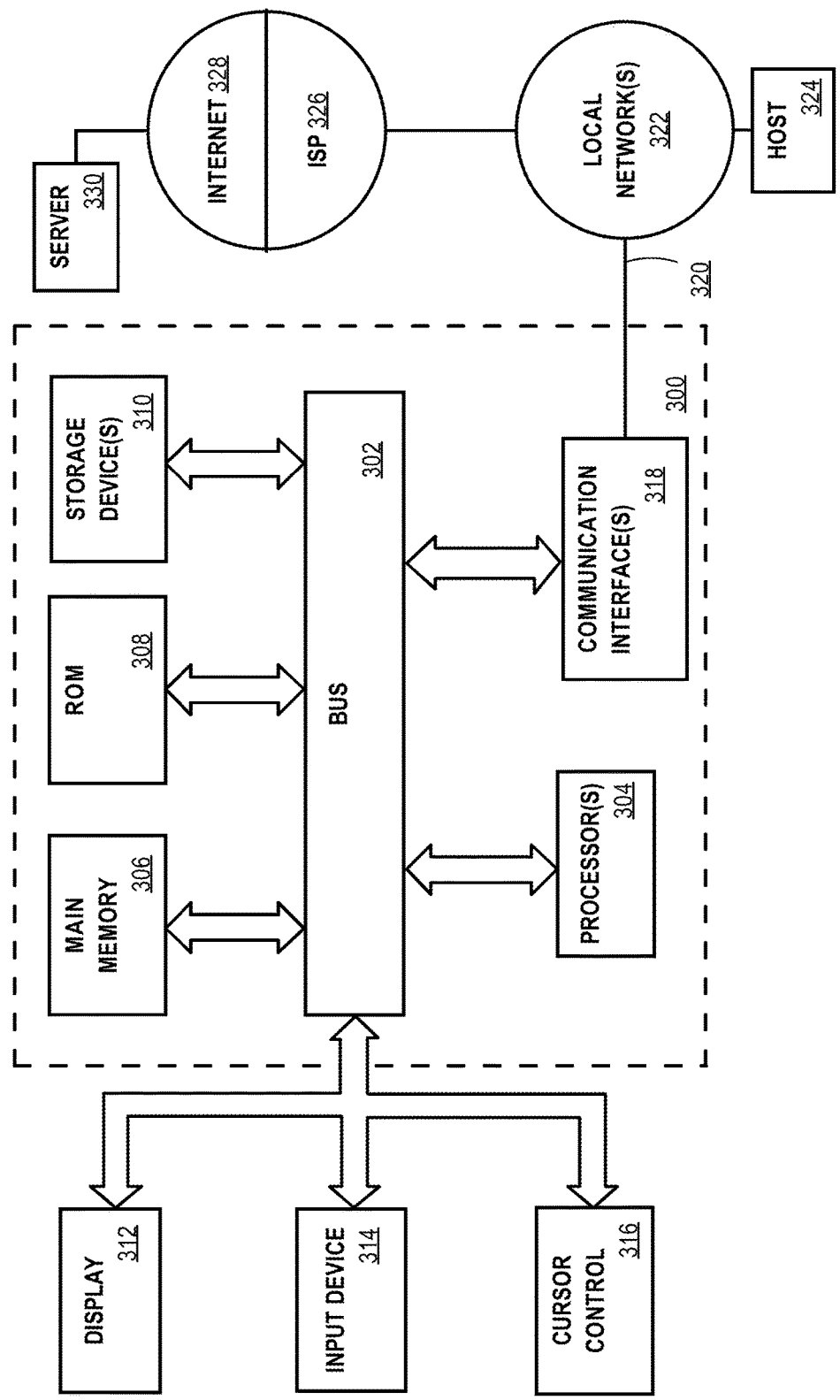
FIG. 3 is a block diagram of a computing device in which the example embodiment(s) of the present invention may be embodied.

Referring now to FIG. 3, it is a block diagram that illustrates a computing device 300 in which the example embodiment(s) of the present invention may be embodied. Computing device 300 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 300 may include a bus 302 or other communication mechanism for addressing main memory 306 and for transferring data between and among the various components of device 300.

Computing device 300 may also include one or more hardware processors 304 coupled with bus 302 for processing information. A hardware processor 304 may be a general purpose microprocessor, a system on a chip (SoC), or other processor.

Main memory 306, such as a random access memory (RAM) or other dynamic storage device, also may be coupled to bus 302 for storing information and software instructions to be executed by processor(s) 304. Main memory 306 also may be used for storing temporary variables or other intermediate information during execution of software instructions to be executed by processor(s) 304.

Software instructions, when stored in storage media accessible to processor(s) 304, render computing device 300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 300 also may include read only memory (ROM) 308 or other static storage device coupled to bus 302 for storing static information and software instructions for processor(s) 304.

One or more mass storage devices 310 may be coupled to bus 302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 310 (e.g., the main hard disk for the device) stores a body of program and data for directing operation of the computing device, including an operating system, user application programs, driver and other support files, as well as other data files of all sorts.

Computing device 300 may be coupled via bus 302 to display 312, such as a liquid crystal display (LCD) or other electronic visual display, for displaying information to a computer user. In some configurations, a touch sensitive surface incorporating touch detection technology (e.g., resistive, capacitive, etc.) may be overlaid on display 312 to form a touch sensitive display for communicating touch gesture (e.g., finger or stylus) input to processor(s) 304.

An input device 314, including alphanumeric and other keys, may be coupled to bus 302 for communicating information and command selections to processor 304. In addition to or instead of alphanumeric and other keys, input device 314 may include one or more physical buttons or switches such as, for example, a power (on/off) button, a "home" button, volume control buttons, or the like.

Another type of user input device may be a cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

While in some configurations, such as the configuration depicted in FIG. 3, one or more of display 312, input device 314, and cursor control 316 are external components (i.e., peripheral devices) of computing device 300, some or all of display 312, input device 314, and cursor control 316 are integrated as part of the form factor of computing device 300 in other configurations.

Functions of the disclosed systems, methods, and modules may be performed by computing device 300 in response to processor(s) 304 executing one or more programs of software instructions contained in main memory 306. Such software instructions may be read into main memory 306 from another storage medium, such as storage device(s) 310. Execution of the software instructions contained in main memory 306 cause processor(s) 304 to perform the functions of the example embodiment(s).

While functions and operations of the example embodiment(s) may be implemented entirely with software instructions, hard-wired or programmable circuitry of computing device 300 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more software instructions to processor(s) 304 for execution. For example, the software instructions may initially be carried on a magnetic disk or solid-state drive of a remote computer. The remote computer can load the software instructions into its dynamic memory and send the software instructions over a telephone line using a modem. A modem local to computing device 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor(s) 304 retrieves and executes the software instructions. The software instructions received by main memory 306 may optionally be stored on storage device(s) 310 either before or after execution by processor(s) 304.

Computing device 300 also may include one or more communication interface(s) 318 coupled to bus 302. A communication interface 318 provides a two-way data communication coupling to a wired or wireless network link 320 that is connected to a local network 322 (e.g., Ethernet network, Wireless Local Area Network, cellular phone network, Bluetooth wireless network, or the like). Communication interface 318 sends and receives electrical, electromagnetic, or optical signals that carry digital data streams representing various types of information. For example, communication interface 318 may be a wired network interface card, a wireless network interface card with an integrated radio antenna, or a modem (e.g., ISDN, DSL, or cable modem).

Network link(s) 320 typically provide data communication through one or more networks to other data devices. For example, a network link 320 may provide a connection through a local network 322 to a host computer 324 or to data equipment operated by an Internet Service Provider (ISP) 326. ISP 326 in turn provides data communication services through the world wide packet data communication network now commonly referred to as the "Internet" 328. Local network(s) 322 and Internet 328 use electrical, electromagnetic or optical signals that carry digital data streams. The signals through the various networks and the signals on network link(s) 320 and through communication interface(s) 318, which carry the digital data to and from computing device 300, are example forms of transmission media.

Computing device 300 can send messages and receive data, including program code, through the network(s), network link(s) 320 and communication interface(s) 318. In the Internet example, a server 330 might transmit a requested code for an application program through Internet 328, ISP 326, local network(s) 322 and communication interface(s) 318.

The received code may be executed by processor 304 as it is received, and/or stored in storage device 310, or other non-volatile storage for later execution.

5.0 IMPLEMENTATION MECHANISMS—SOFTWARE OVERVIEW

Figure 4:
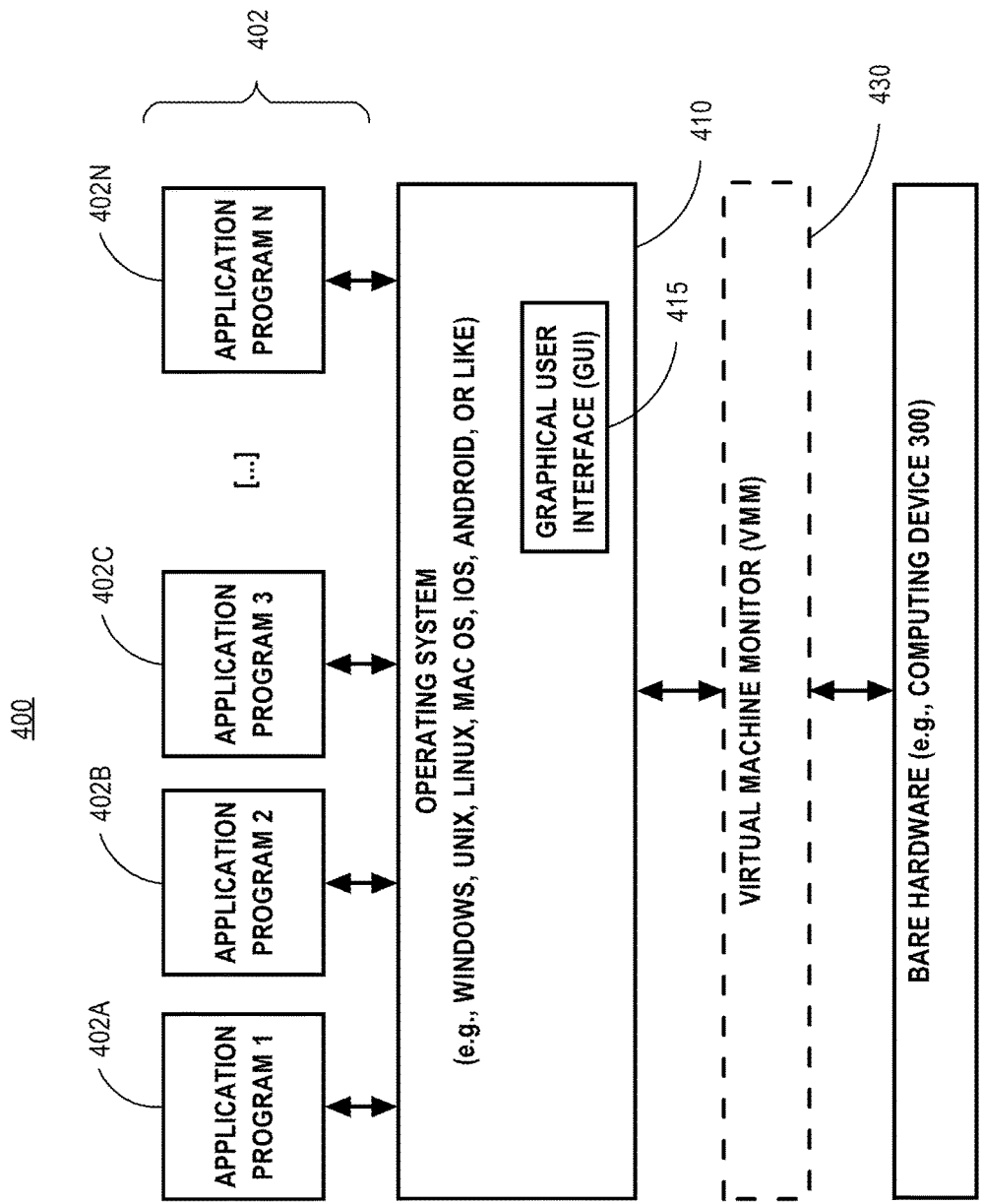
FIG. 4 is a block diagram of a software system for controlling the operation of the computing device.

FIG. 4 is a block diagram of a software system 400 that may be employed for controlling the operation of computing device 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:
1. A method, comprising:
receiving a first set of data comprising a plurality of unstructured data records;
receiving a schema that describes characteristics of the plurality of unstructured data records and relationships between one or more data records of the plurality of unstructured data records;
generating, based on the first set of data and the schema, a first plurality of structured data records, wherein the first plurality of structured data records organizes the plurality of unstructured data records based on the schema;

causing to be displayed, at a client computing device, the first plurality of structured data records;

receiving schema modification instructions;

in response to receiving the schema modification instructions, modifying the schema based on the schema modification instructions;

generating, based on the modified schema and the first set of data, a second plurality of structured data records, wherein the second plurality of structured data records organizes the plurality of unstructured data records based on modified schema;

in response to receiving the schema modification instructions, causing to be displayed, at the client computing device, the second plurality of structured data records;

wherein the method is performed using one or more processors.

2. The method of claim 1, further comprising:

extracting a second set of data from one or more data sources; and applying a data modification rule to the second set of data to generate, at least in part, the first set of data.

3. The method of claim 2, wherein the data modification rule comprises a rule for removing a field from the second set of data.

4. The method of claim 2, wherein the data modification rule comprises a rule for normalizing a value for a field from the second set of data.

5. The method of claim 2, wherein the data modification rule comprises a rule for joining the second set of data with a third set of data.

6. The method of claim 2, wherein the second set of data is a file of comma separated values.

7. The method of claim 1, wherein the first set of data is a set of data in a JavaScript Object Notation (JSON) format.

8. The method of claim 1, further comprising:

in response to receiving schema approval input, causing the first set of data and the schema to be transmitted to a second system for processing.

9. One or more non-transitory computer-readable media storing instructions, which when executed by one or more hardware processors cause:

receiving a first set of data comprising a plurality of unstructured data records;

receiving a schema that describes characteristics of the plurality of unstructured data records and relationships between one or more data records of the plurality of unstructured data records;

storing a first set of data using a first system, wherein the first system comprises a schema that describes objects and properties in the first set of data;

generating, based on the first set of data and the schema, a first plurality of structured data records, wherein the first plurality of structured data records organizes the plurality of unstructured data records based on the schema;

causing to be displayed, at a client computing device, the first plurality of structured data records;

receiving schema modification instructions;

in response to receiving the schema modification instructions, modifying the schema based on the schema modification instructions;

generating, based on the modified schema and the first set of data, a second plurality of structured data records, wherein the second plurality of structured data records organizes the plurality of unstructured data records based on modified schema;

in response to receiving the schema modification instructions, causing to be displayed, at the client computing device, the second plurality of structured data records.

10. The one or more non-transitory computer-readable media of claim 9, the instructions further comprising instructions, which when executed by one or more hardware processors cause:

extracting a second set of data from one or more data sources; and applying a data modification rule to the second set of data to generate, at least in part, the first set of data.

11. The one or more non-transitory computer-readable media of claim 10, wherein the data modification rule comprises a rule for removing a field from the second set of data.

12. The one or more non-transitory computer-readable media of claim 10, wherein the data modification rule comprises a rule for normalizing a value for a field from the second set of data.

13. The one or more non-transitory computer-readable media of claim 10, wherein the data modification rule comprises a rule for joining the second set of data with a third set of data.

14. The one or more non-transitory computer-readable media of claim 10, wherein the second set of data is a file of comma separated values.

15. The one or more non-transitory computer-readable media of claim 9, wherein the first set of data is a set of data in a JavaScript Object Notation (JSON) format.

16. The one or more non-transitory computer-readable media of claim 9, the instructions further comprising instructions, which when executed by one or more hardware processors cause:

in response to receiving schema approval input, causing the first set of data and the schema to be transmitted to a second system for processing.

17. A method comprising:

receiving a first set of data, wherein the first set of data comprises a plurality of data fields;

analyzing a particular data field of the plurality of data fields to determine a particular property type of the data field;

using the particular property type, at least in part, to generate a database schema;

storing the first set of data in a secondary data store using the database schema;

wherein the method is performed using one or more processors.

18. The method of claim 17, further comprising:

indexing the secondary data store asynchronously.

19. The method of claim 17, wherein the first set of data is formatted in a JavaScript Object Notation (JSON) format.

20. The method of claim 17, wherein the secondary data store does not store logging data.

* * * * *